US012769057B2

(12) United States Patent
Frish et al.

(10) Patent No.: US 12,769,057 B2
(45) Date of Patent: Oct. 20, 2026

(54) OPTICAL MODE CONVERTOR

(71) Applicant: Intel Corporation, Santa Clara, CA (US)

(72) Inventors: Harel Frish, Albuquerque, NM (US); Pegah Seddighian, San Jose, CA (US); Kelly Magruder, Albuquerque, NM (US); Olufemi Dosunmu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 300 days.

(21) Appl. No.: 18/496,672

(22) Filed: Oct. 27, 2023

(65) Prior Publication Data

US 2024/0184048 A1 Jun. 6, 2024

Related U.S. Application Data

(60) Provisional application No. 63/429,335, filed on Dec. 1, 2022.

(51) Int. Cl.

*G02B 6/12* (2006.01)
*G02B 6/122* (2006.01)
*G02B 6/14* (2006.01)

(52) U.S. Cl.

CPC ............ *G02B 6/14* (2013.01); *G02B 6/1228* (2013.01); *G02B 2006/121* (2013.01); *G02B 2006/12152* (2013.01)

(58) Field of Classification Search

CPC .................... G02B 6/1228; G02B 6/14; G02B 2006/12152
See application file for complete search history.

(56) References Cited

U.S. PATENT DOCUMENTS

| | | | | |
|---|---|---|---|---|
| 6,980,720 | B2 * | 12/2005 | Gothoskar | G02B 6/1228 385/33 |
| 10,845,669 | B2 * | 11/2020 | Mahgerefteh | G02F 1/2257 |
| 2016/0327759 | A1 * | 11/2016 | Keyvaninia | G02B 6/12 |
| 2019/0137688 | A1 * | 5/2019 | Lin | G02B 6/1228 |

* cited by examiner

*Primary Examiner* — Charlie Y Peng
(74) *Attorney, Agent, or Firm* — Schwabe, Williamson & Wyatt, P.C.

(57) ABSTRACT

Embodiments relate to an apparatus that includes: an input stage with an input Si slab height, an input Si waveguide height, and an input height difference between the input Si slab height and the input Si waveguide height; an output stage with an output Si slab height that is different from the input Si slab height, an output Si waveguide height that is different from the input Si waveguide height, and an output height difference between the output Si slab height and the output Si waveguide height that is different from the input height difference; and a transition stage positioned between the input stage and the output stage, wherein the transition stage has a transition Si slab height, a transition Si waveguide height, and a transition height difference between the transition Si slab height and the transition Si waveguide height. Other embodiments may be described and/or claimed.

14 Claims, 5 Drawing Sheets

OPTICAL MODE CONVERTOR

CROSS-REFERENCE TO RELATED APPLICATIONS

The present application claims priority to U.S. Provisional Patent Application 63/429,335, filed Dec. 1, 2022, the contents of which is incorporated herein in their entirety.

BACKGROUND

Some photonics chips may require a transition from a silicon (Si) waveguide with a first thickness to a second thickness. However, in some cases such a transition may result in significant loss of optical power.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
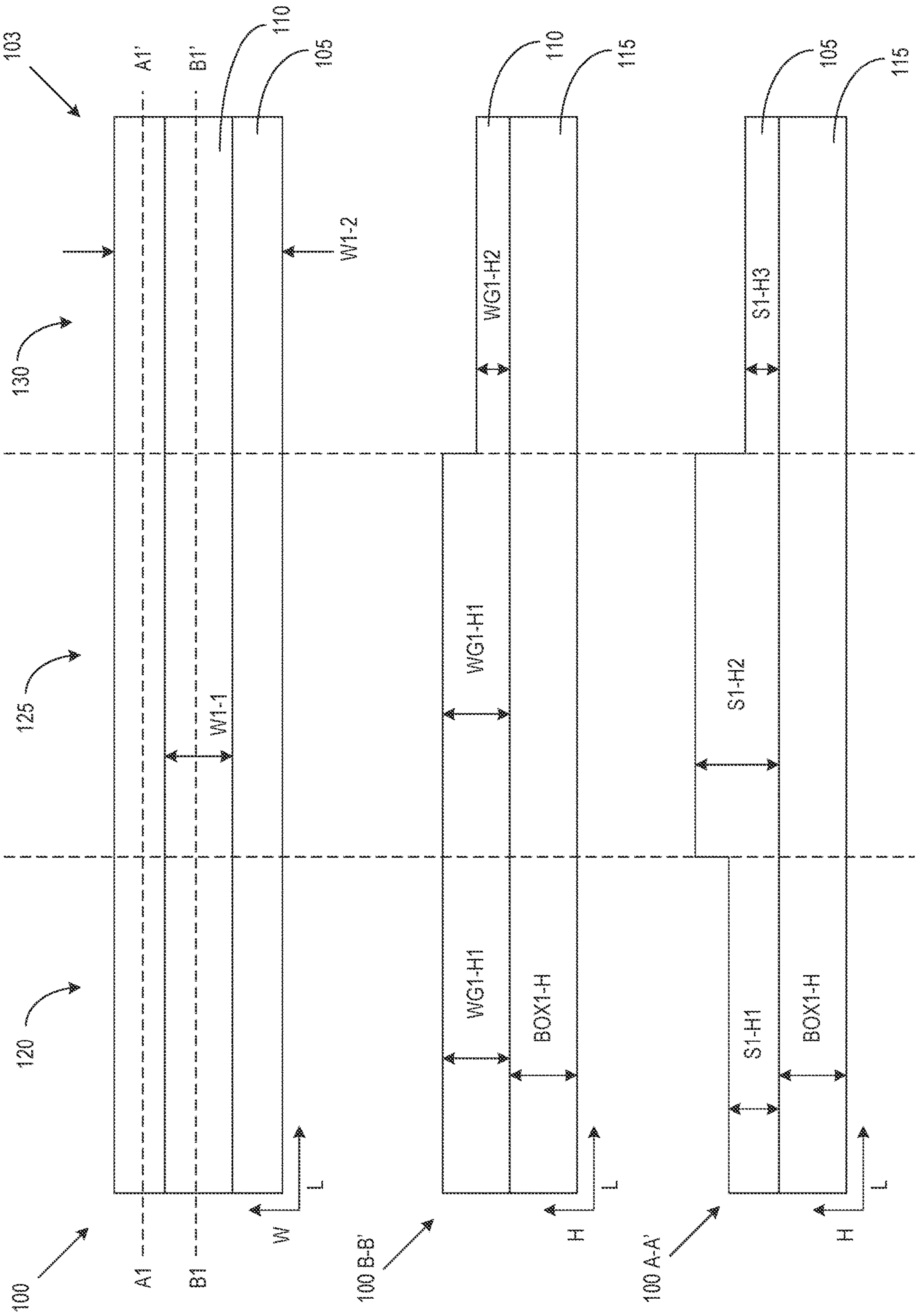
FIG. 1 illustrates an example optical mode convertor, in accordance with various embodiments.

As noted above, some photonics chips may require a transition from a Si waveguide with a first thickness to a second thickness. To use a specific example, a silicon-on-insulator (SOI) chip may include a laser or other optical source mounted thereon. The SOI chip may include a Si waveguide and a Si slab positioned on a buried oxide (BOX) layer. In some embodiments, the laser may require an optical waveguide with a thickness of approximately 400 nanometers (nm).

However, the SOI chip may further include a modulator (e.g., a ring-based modulator or some other type of modulator), or optically couple with a modulator, that performs with relatively fast operation and/or low power requirements. For example, the modulator may process signals at approximately 200 gigahertz (GHz) per lane. In this application, it may be desirable for the optical waveguide to have an approximately 200 nm thickness, which may enable smaller P/N junctions for the fast operation/low power requirements.

In this use case, it may therefore be desirable to transition from the 400 nm waveguide thickness required by the optical source to the 200 nm waveguide thickness required by the modulator. It may further be desirable to allow the optical source and the modulator to be integrated onto a single die. Finally, it may be desirable to allow such integration to occur with a BOX layer that is approximately 1 micrometer ("micron" or "μm") thick. These characteristics may allow for a smaller lateral or vertical footprint for the chip and/or the photonic circuit with the laser and the modulator, increased operation characteristics, and/or reduced power characteristics.

Legacy photonic circuits may have included SOI wafers with a constant waveguide height, and a BOX layer with an increased thickness (e.g., on the order of approximately 2 microns). Alternatively, if a convertor was used to change from a first waveguide thickness to a second waveguide thickness, only one of the waveguide and the slab may have been changed. However, these legacy circuits may have suffered from relatively high optical loss (e.g., relatively high loss of power of the optical signal). Additionally, the added thickness of the BOX layer may have imposed limitations regarding how or where the optical mode convertor or other elements of the photonic circuit could be placed.

By contrast, embodiments herein describe an optical mode convertor (which may be referred to as an optical mode convertor) that has three stages: an input stage, a transition stage, and an output stage. The various stages may be described with respect to heights of various elements of the optical mode convertor. Specifically, the optical mode convertor may include a Si slab and a Si waveguide. In some embodiments, the Si slab and the Si waveguide may be physically different elements that are manufactured separately, and then joined together on a common BOX layer. In other embodiments, the Si slab and Si waveguide may be formed through placement of a Si layer on a BOX layer (e.g., through deposition or some other means), and then subsequent etching to form the different elements with different heights. In other embodiments, the Si slab and Si waveguide may be formed through some other process or technique, now known or developed in the future.

It will be noted that, although embodiments herein may refer to Si-based elements such as a Si slab and Si waveguide, in other embodiments the waveguide, slab, and/or some other element may additionally or alternatively be formed of another material such as a silicon nitride (SiN) material. Additionally, as used herein, a "waveguide" may refer to a raised portion of an optical material such as Si along which the optical signal propagates. The "slab" may refer to a less-raised portion of a same or similar optical material (e.g., an optical material with same or similar refractive properties) that is generally adjacent to the waveguide.

Generally, an optical signal may propagate from an optical source (e.g., a laser or some other optical source) through the photonic circuit along the Si waveguide. Particularly, with respect to the optical mode convertor, light may enter the optical mode convertor at the input stage. The input stage may have an input Si slab height and an input Si waveguide height, and an input optical mode (e.g., a first shape of light within the Si waveguide and/or Si slab at the input stage).

Light may then pass from the input stage to the transition stage, which may have a transition Si slab height and a transition Si waveguide height. In embodiments, one or both of the transition Si slab height and the transition Si waveguide height may be different from the input Si slab height and the input Si waveguide height. As a result, the transition stage may have a transition optical mode that is different from that of the input optical mode.

Light may then pass from the transition stage to the output stage, which may have an output Si slab height and an output Si waveguide height. In embodiments, one or both of the output Si slab height and the output Si waveguide height may be different from the transition Si slab height and the transition Si waveguide height. As a result, the output stage may have an output optical mode that is different from that of the input optical mode and the transition optical mode. The light may then pass from the output stage to another portion of the photonic circuit for further processing, shaping, modulation, etc.

Through use of the optical mode convertor described herein, the optical mode of the light may be changed from the input optical mode to the output optical mode in a very low-loss manner. Additionally, the optical mode convertor may be capable of implementation on an approximately 1 micron-thick BOX layer, which may provide the various advantages described above. Other advantages or benefits may further be realized, as will be apparent to one of skill in the art.

It will be noted that embodiments herein may be described with respect to terms such as "length," "width," and "height." Unless otherwise stated, length may refer to a measurement that is parallel to a direction of travel of the optical signal through the optical mode convertor. Length may be represented in FIGS. 1 and 2 by the designator "L." Width may refer to a measurement that is perpendicular to the length (e.g., perpendicular to the direction of travel of the optical signal through the optical mode convertor). Width may be represented in FIGS. 1 and 2 by the designator "W." Height may refer to a measurement that is perpendicular to both the length and the width, and may be represented in FIGS. 1 and 2 by the designator "H." Height may also be considered to refer to a measurement that is perpendicular to the face of the BOX layer to which the Si waveguide and/or the Si slab are coupled.

Further, it will be noted that the waveguide and slab may be described as including or being made of silicon. Specifically, the waveguide and/or slab may be formed of doped Si and/or some other similar material as is known in the art. Similarly, the BOX layer may be formed of a thermal oxide material.

As noted above, the different stages of the optical mode convertor may be described with respect to the Si slab height and the Si waveguide height. Such measurements may refer to a height of the Si slab and the Si waveguide, respectively, which is measured from the BOX layer to which the Si slab/waveguide are affixed. In addition to those two measurements, a third measurement discussed herein may be referred to as a "height difference." Specifically, the height difference may refer to a difference between the Si slab height and the Si waveguide height. So, for example, the input height difference may refer to a difference between the input Si slab height and the input Si waveguide height. The transition height difference may likewise refer to a difference between the transition Si slab height and the transition Si waveguide height. Finally, the output height difference may refer to a difference between the output Si slab height and the output Si waveguide height.

Figure 2:
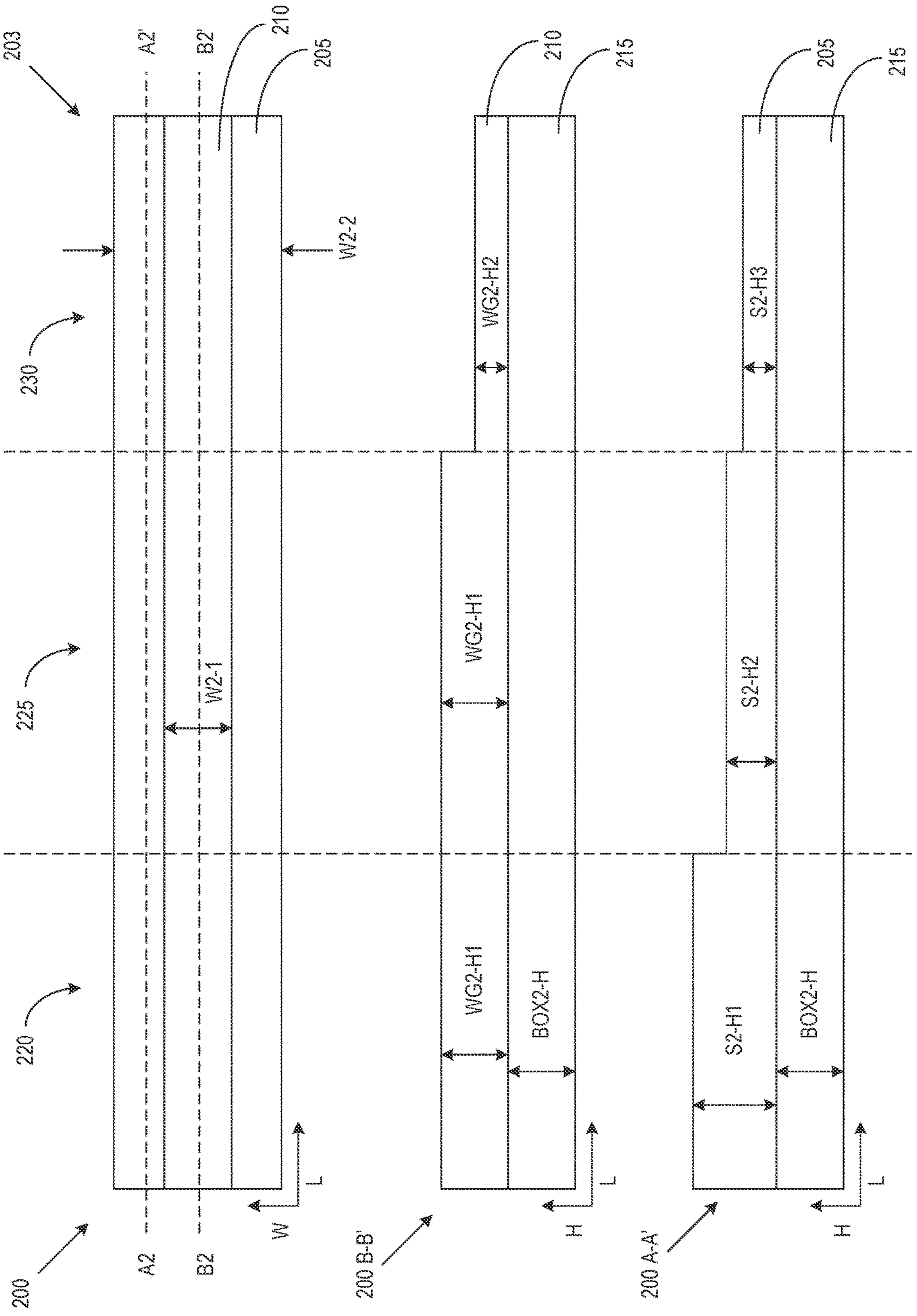
FIG. 2 illustrates an alternative example optical mode convertor, in accordance with various embodiments.
Figure 5:
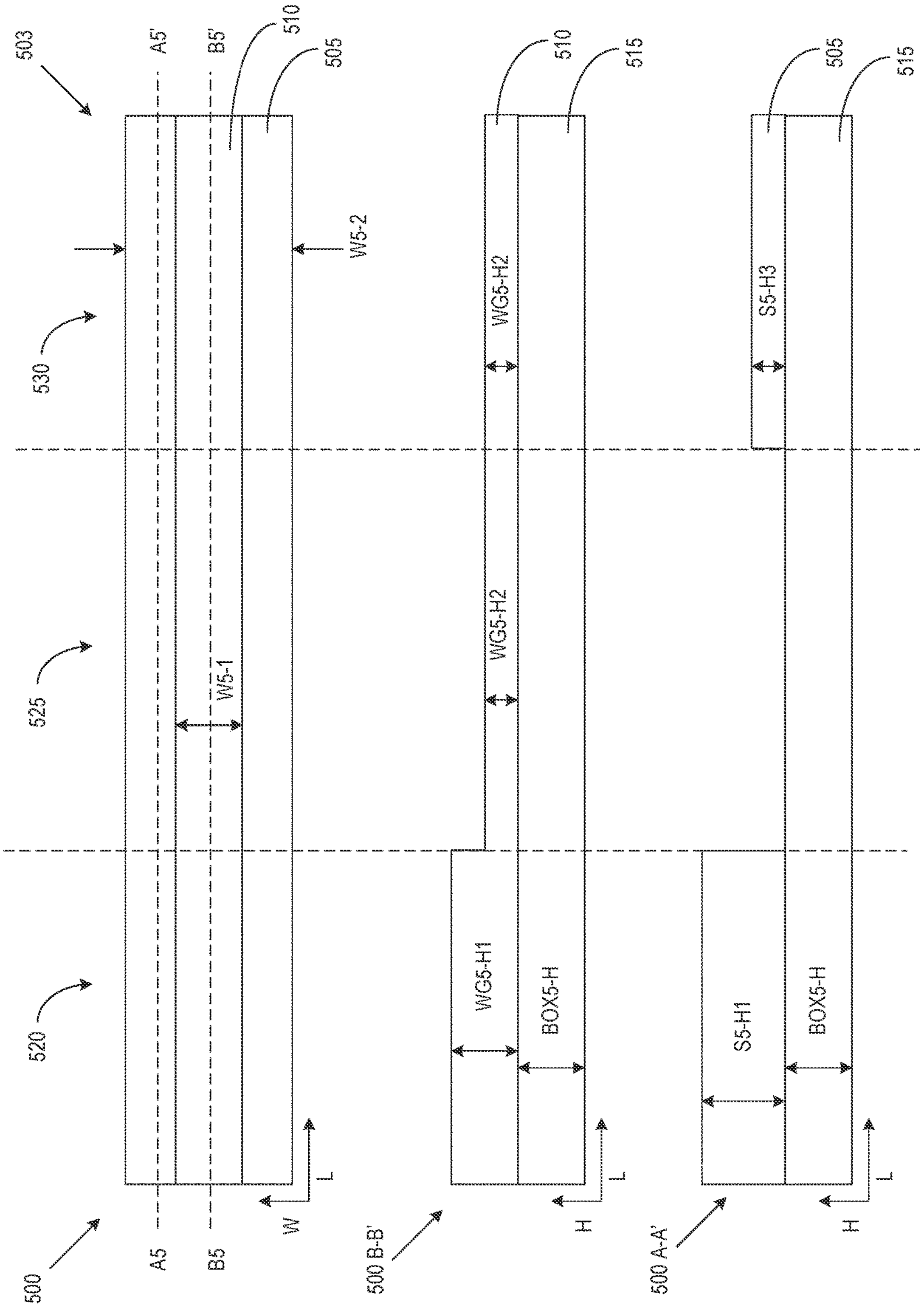
FIG. 5 illustrates an alternative example optical mode convertor, in accordance with various embodiments.

FIG. 1 depicts an example optical mode convertor 103 via three different views. Similarly, FIG. 2 depicts an alternative example optical mode convertor 203 with three different views. Similarly, FIG. 5 depicts another alternative example optical mode convertor 503 with three different views. It will be understood that the optical mode convertors 103/203/503 are not drawn to scale, and relative dimensions of heights, widths, and/or lengths should not be inferred based solely on the dimensions of the provided Figures. Rather, the Figures are drawn at least partially for the sake of discussion and an understanding of relative height changes at various stages of the optical mode convertors 103/203/503. Example dimensions are provided at, for example, Tables 1, 2, and 3 below.

Returning to FIG. 1, view 100 may be considered to be a top-down view of the optical mode convertor 103. View 100 B-B' may be considered to be a cross-sectional view of the Si waveguide 110 of the optical mode convertor 103, taken along line B1-B1'. View 100 A-A' may be considered to be a cross-sectional view of the Si slab 105 of the optical mode convertor 103, taken along line A1-A1'. The views may respectively include an input stage 120, a transition stage 125, and an output stage 130.

As may be seen in view 100, the Si slab 105 may have a width W1-2, and the Si waveguide 110 may have a width W1-1. The width W1-1 may be on the order of approximately 400 nm, although in other embodiments the width W1-1 may be greater or smaller (e.g., between approximately 300 nm and approximately 500 nm). It will be noted that, although the width W1-1 is depicted as consistent along the length L of the optical mode convertor 103, in some embodiments the width W1-1 may vary; for example, at the points where the optical mode convertor 103 changes from one stage (e.g., the input stage 120 or the transition stage 125) to another (e.g., the transition stage 125 or the output stage 130). For example, the width W1-1 may be narrower near a midpoint of a given stage, and wider at a point where the optical mode convertor 103 changes from one stage to another.

As may be seen in view 100 B-B', the Si waveguide 110 may have an input Si waveguide height (e.g., a height of the Si waveguide 110 at the input stage 120) of WG1-H1. Similarly, the Si waveguide 110 may have a transition Si waveguide height (e.g., a height of the Si waveguide 110 at the transition stage 125) of WG1-H1. Finally, the Si waveguide 110 may have an output Si waveguide height (e.g. a height of the Si waveguide 110 at the output stage 130) of WG1-H2.

Similarly, as may be seen in view 100 A-A', the Si slab 105 may have an input Si slab height (e.g., a height of the Si slab 105 at the input stage 120) of S1-H1. Similarly, the Si slab 105 may have a transition Si slab height (e.g., a height of the Si slab 105 at the transition stage 125) of S1-H2. Finally, the Si slab 105 may have an output Si slab height (e.g., a height of the Si slab 105 at the output stage 130) of S1-H3.

As previously noted, the Si slab 105 and the Si waveguide 110 may be positioned on a BOX layer 115, which may be similar to the BOX layer described above. In embodiments, the BOX layer 115 may have a height BOX1-H.

Table 1, below, depicts example values for the various heights that may be depicted in FIG. 1:

TABLE 1

Example Heights of Optical Mode Convertor 103

| | Input Stage 120 | Transition stage 125 | Output stage 130 |
|---|---|---|---|
| Si Waveguide Height | WG1 − H1 = 400 nm | WG1 − H1 = 400 nm | WG1 − H2 = 200 nm |

TABLE 1-continued

| Example Heights of Optical Mode Convertor 103 | | | |
|---|---|---|---|
| | Input Stage 120 | Transition stage 125 | Output stage 130 |
| Si Slab Height | S1 − H1 = 200 nm | S1 − H2 = 250 nm | S1 − H3 = 50 nm |
| Height Difference (Si Waveguide height − Si Slab height) | 200 nm | 150 nm | 150 nm |
| BOX Layer Height | 1 μm | 1 μm | 1 μm |

It will be understood by one of skill in the art that the above-provided dimensions of Table 1 may help facilitate a transition of the optical mode from the input optical mode to the output optical mode in a low-loss or no-loss manner. Specifically, as may be seen, the Si slab height S1-H2 may be increased to achieve a change in the height difference from the input stage 120 to the height difference of the transition stage 125. Specifically, the height difference may transition from 200 nm to 150 nm. Then, both the Si waveguide height and the Si slab height may be changed from the transition stage 125 to the output stage 130 to maintain the desired height difference from the transition stage 125 to the output stage 130 while also enabling to the smaller P/N junctions described above. It is estimated that use of the optical mode convertor 103 may result in very low optical losses such as approximately 0.08 decibels (dB) as the optical signal traverses through the optical mode convertor 103.

As noted, FIG. 2 depicts an alternative example optical mode convertor 203 through the depiction of three different views. The optical mode convertor 203 may include an Si waveguide 210, an Si slab 205, and a BOX layer 215, which may be respectively similar to, and share one or more characteristics with, Si waveguide 110, Si slab 105, and BOX layer 115. For example, the BOX layer 215 may have a height of BOX2-H, which may be similar to height BOX1-H.

View 200 may be considered to be a top-down view of the optical mode convertor 203. View 200 B-B' may be considered to be a cross-sectional view of the Si waveguide 210 of the optical mode convertor 203, taken along line B2-B2. View 200 A-A' may be considered to be a cross-sectional view of the Si slab 205 of the optical mode convertor 203, taken along line A2-A2'. The views may respectively include an input stage 220, a transition stage 225, and an output stage 230.

As may be seen in view 200, the Si slab 205 may have a width W2-2, and the Si waveguide 210 may have a width W2-1, which may be respectively similar to, and share one or more characteristics with, width W1-2 and W1-1. As may be seen in view 200 B-B', the Si waveguide 210 may have an input Si waveguide height of WG2-H1. Similarly, the Si waveguide 210 may have a transition Si waveguide height of WG2-H1. Finally, the Si waveguide 210 may have an output Si waveguide height of WG2-H2. Similarly, as may be seen in view 200 A-A', the Si slab 205 may have an input Si slab height of S2-H1. Similarly, the Si slab 205 may have a transition Si slab height of S2-H2. Finally, the Si slab 205 may have an output Si slab height of S2-H3.

TABLE 2

| Example Heights of Optical Mode Convertor 203 | | | |
|---|---|---|---|
| | Input Stage 220 | Transition stage 225 | Output stage 230 |
| Si Waveguide Height | WG2 − H1 = 400 nm | WG2 − H1 = 400 nm | WG2 − H2 = 300 nm |
| Si Slab Height | S2 − H1 = 200 nm | S2 − H2 = 160 nm | S2 − H3 = 60 nm |
| Height Difference (Si Waveguide height − Si Slab height) | 200 nm | 240 nm | 240 nm |
| BOX Layer Height | 1 μm | 1 μm | 1 μm |

It will be understood by one of skill in the art that, similarly to optical mode convertor 103, the above-provided dimensions of Table 2 may help facilitate a transition of the optical mode from the input optical mode to the output optical mode in a low-loss or no-loss manner. Specifically, as may be seen, the Si slab height S2-H2 may be decreased to achieve a change in the height difference from the input stage 220 to the height difference of the transition stage 225. Specifically, the height difference may transition from 200 nm to 240 nm. Then, both the Si waveguide height and the Si slab height may be changed from the transition stage 225 to the output stage 230 to maintain the desired height difference from the transition stage 225 to the output stage 230 while also enabling the smaller P/N junctions described above. It is estimated that use of the optical mode convertor 203 may result in very low optical losses on the order of those described above with respect to FIG. 1 as the optical signal traverses through the optical mode convertor 203.

Similarly, FIG. 5 depicts an alternative example optical mode convertor 503 through the depiction of three different views. The optical mode convertor 503 may include an Si waveguide 510, an Si slab 505, and a BOX layer 515, which may be respectively similar to, and share one or more characteristics with, Si waveguide 110, Si slab 105, and BOX layer 115. For example, the BOX layer 515 may have a height of BOX5-H, which may be similar to height BOX1-H.

View 500 may be considered to be a top-down view of the optical mode convertor 503. View 500 B-B' may be considered to be a cross-sectional view of the Si waveguide 510 of the optical mode convertor 503, taken along line B5-B5. View 500 A-A' may be considered to be a cross-sectional view of the Si slab 505 of the optical mode convertor 503, taken along line A5-A5'. The views may respectively include an input stage 520, a transition stage 525, and an output stage 530.

As may be seen in view 500, the Si slab 505 may have a width W5-2, and the Si waveguide 510 may have a width W5-1, which may be respectively similar to, and share one or more characteristics with, width W5-2 and W5-1. As may be seen in view 500 B-B', the Si waveguide 510 may have an input Si waveguide height of WG5-H1. Similarly, the Si waveguide 510 may have a transition Si waveguide height of WG5-H2. Finally, the Si waveguide 510 may have an output Si waveguide height of WG5-H2. As may be seen in view 500 A-A', the Si slab 505 may have an input Si slab height of S5-H1. Similarly, the Si slab 505 may have an output Si slab height of S5-H3. In this embodiment, the Si slab 505 may not be present in the transition stage 525. That is, in the transition stage 525, the Si slab 505 may be etched away such that the BOX layer 515 is exposed. Because the Si slab 505 is not present in the transition stage 525, an alphanumeric indicator (e.g., S5-H2) is not shown in FIG. 5 for the sake of clarity

TABLE 3

Example Heights of Optical Mode Convertor 503

| | Input Stage 520 | Transition stage 525 | Output stage 530 |
|---|---|---|---|
| Si Waveguide Height | WG5 − H1 = 400 nm | WG5 − H2 = 200 nm | WG5 − H2 = 200 nm |
| Si Slab Height | S5 − H1 = 200 nm | 0 nm | S5 − H3 = 50 nm |
| Height Difference (Si Waveguide height − Si Slab height) | 200 nm | 200 nm | 150 nm |
| BOX Layer Height | 1 μm | 1 μm | 1 μm |

It will be understood by one of skill in the art that, similarly to optical mode convertor 103, the above-provided dimensions of Table 3 may help facilitate a transition of the optical mode from the input optical mode to the output optical mode in a low-loss or no-loss manner. In contrast to the configurations of the optical mode convertors 103 and 203 of FIGS. 1 and 2, respectively, in this embodiment both the Si waveguide height and the Si slab height of the optical mode convertor 503 may be changed from the input stage 520 to the output stage 525. By changing the height of both the Si waveguide 510 and the Si slab 505, the height difference of 200 nm between the input stage 520 and the transition stage 525 may be maintained while the height of the Si waveguide 510 is set at the height that is desired for the output stage 530 (e.g., 200 nm). The height of the Si slab 505 may then be changed between the transition stage 525 and the output stage 530 to achieve the configuration and height offset that is desired for the output stage. Similarly to optical mode convertors 103 or 203, it is expected that optical mode convertor 503 will achieve similar low-loss or no-loss characteristics while further enabling the desired P/N junctions as described above.

It will be understood that the above-described examples are intended as non-limiting examples of various configurations of an optical mode convertor, and other embodiments may vary. For example, other embodiments may have different Si waveguide and/or Si slab heights from those given above. As one example, in some embodiments the heights provided with respect to Tables 1, 2, and/or 3 may be approximate heights (e.g., on the order of +/−10% of those depicted) to account for manufacturing-tolerances and/or imperfections. In some embodiments, different ones of the heights may be different in another embodiment (e.g., a slab height and/or waveguide height may be greater or lesser than that depicted and, for example, be approximately 500 nm, 1000 nm, or some other height). The specific heights and height offsets may be based on factors such as the specific use case to which the optical mode convertor may be put, the specific wavelength(s) of the optical signal, size-based considerations, etc.

In some embodiments, rather than changing the Si slab height at the transition stage, only the Si waveguide height may be changed while maintaining the Si slab height. In some embodiments, if both the Si waveguide height and the Si slab height are changed, one or both of the Si waveguide and the Si slab may be increased rather than decreased (for example, to achieve a desired height offset). Other variations or permutations may be possible in other embodiments, and are not listed here for the sake of lack of redundancy.

Figure 3:
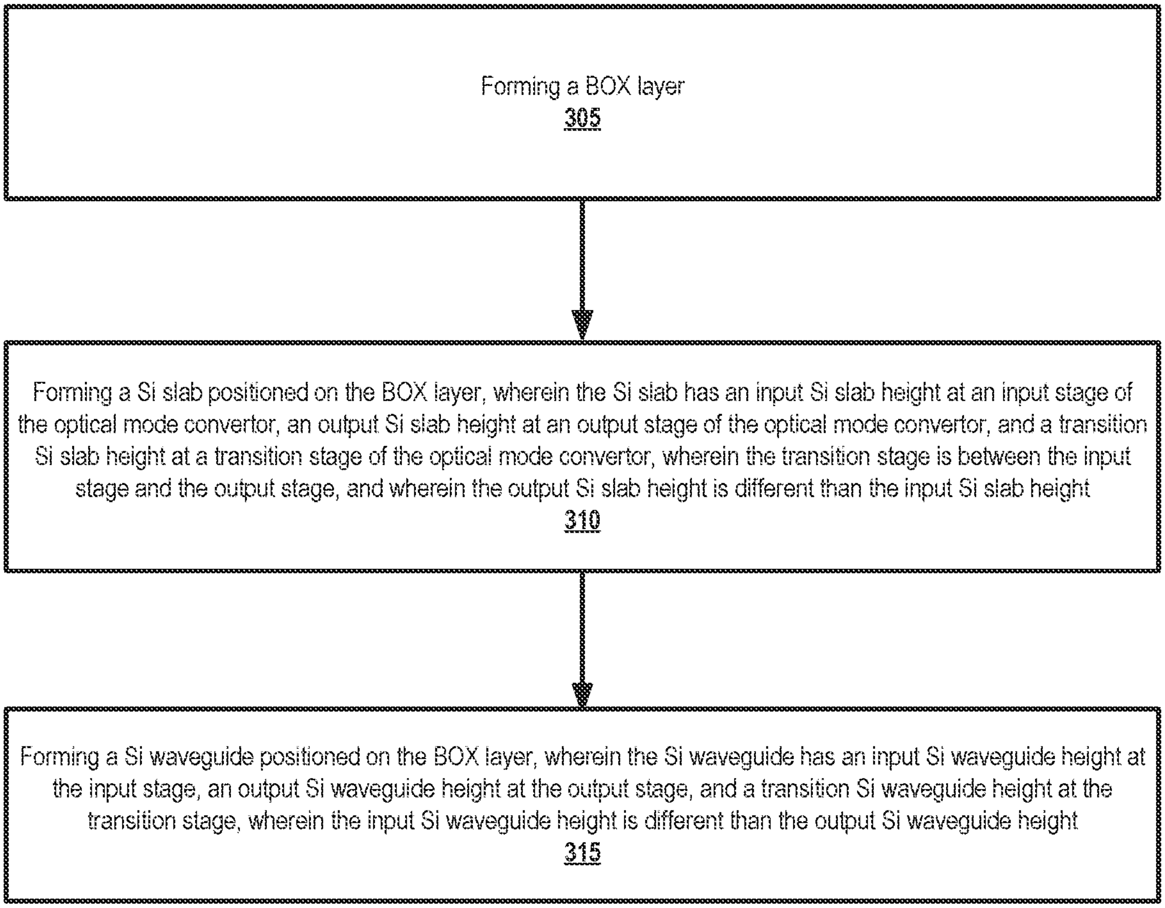
FIG. 3 illustrates an example technique related to forming an optical mode convertor, in accordance with various embodiments.

FIG. 3 illustrates an example technique related to generating an optical mode convertor such as optical mode convertors 103 or 203, and/or some other optical mode convertor, in accordance with various embodiments. While the blocks are illustrated in a particular sequence, the sequence can be modified. For example, some blocks can be performed before others, while some blocks can be performed simultaneously with other blocks.

The technique may include forming, at 305, a BOX layer. The BOX layer may be similar to BOX layers 115 or 215, and may be formed through a process such as deposition and/or some other process.

The technique may further include forming, at 310, a Si slab positioned on the BOX layer. The Si slab may be similar to, for example, Si slabs 105 or 205. As has been previously discussed, the Si slab may have an input Si slab height (e.g., S1-H1 or S2-H1) at an input stage (e.g., stage 120 or 220) of the optical mode convertor; an output Si slab height (e.g., S1-H3 or S2-H3) at an output stage (e.g., stage 130 or 230) of the optical mode convertor; and a transition Si slab height (e.g., S1-H2 or S2-H2) at a transition stage (e.g., stage 125) of the optical mode convertor. As has been previously noted, the transition stage may be positioned between the input stage and the output stage, and the output Si slab height may be different from the input Si slab height.

The technique may further include forming, at 315, a Si waveguide positioned on the BOX layer. The Si waveguide may be similar to, for example, Si waveguide 110 or 210. The Si waveguide may have an input Si waveguide height (e.g., WG1-H1 or WG2-H1) at the input stage; an output Si waveguide height (e.g., WG1-H2 or WG2-H2) at the output stage; and a transition Si waveguide height (e.g., WG1-H1 or WG2-H1) at the transition stage. As previously noted, the input Si waveguide height may be different from the output Si waveguide height.

The flowchart of FIG. 3 can be performed partially or wholly at the instruction stored as computer-executable instructions (e.g., instructions to implement any other processes discussed herein). Program software code/instructions associated with the flowchart (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in a processor. In some embodiments, the program software code/instructions associated with a flowchart (and/or various embodiments) are executed by the processor system.

In some embodiments, the program software code/instructions associated with the flowchart (and/or various embodiments) are stored in a computer-executable storage medium and executed by the processor. Here, the computer-executable storage medium is a tangible machine-readable medium that can be used to store program software code/instructions and data that, when executed by a computing device, cause one or more processors to perform a method(s) as may be recited in one or more accompanying claims directed to the disclosed subject matter.

The tangible machine-readable medium may include storage of the executable software program code/instructions and data in various tangible locations, such as ROM, volatile RAM, non-volatile memory and/or cache, and/or other tangible memory as referenced in the present application. Portions of this program software code/instructions and/or data may be stored in any one of these storage and memory devices. Further, the program software code/instructions can be obtained from other storage-including, e.g., through centralized servers or peer-to-peer networks and the like, including the Internet. Different portions of the software program code/instructions and data can be obtained at different times and in different communication sessions or in the same communication session.

The software program code/instructions (associated with the flowchart and other embodiments) and data can be obtained in their entirety prior to the execution of a software program or application by the computing device. Alternatively, portions of the software program code/instructions and data can be obtained dynamically—e.g., just in time—when needed for execution. Alternatively, some combination of these ways of obtaining the software program code/instructions and data may occur—e.g., for different applications, components, programs, objects, modules, routines, or other sequences of instructions or organization of sequences of instructions. Thus, it is not required that the data and instructions be on a tangible machine-readable medium in entirety at a particular instance of time.

Examples of the tangible computer-readable media include but are not limited to recordable and non-recordable type media such as volatile and non-volatile memory devices, read-only memory (ROM), random-access memory (RAM), flash-memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical, or other forms of propagating signals, such as carrier waves, infrared signals, digital signals, etc., through such tangible communication links.

In general, tangible machine-readable medium includes any tangible mechanism that provides (e.g., stores and/or transmits in digital form, such as data packets) information in a form accessible by a machine (e.g., a computing device), which may be included (e.g., in a communication device, a computing device, a network device, a personal digital assistant, a manufacturing tool, or a mobile communication device), whether or not able to download and run applications and subsidized applications from the communication network, such as the Internet (e.g., an iPhone®, Galaxy®, Blackberry® Droid®, or the like), or any other device that includes a computing device. In one embodiment, a processor-based system might be in the form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 4:
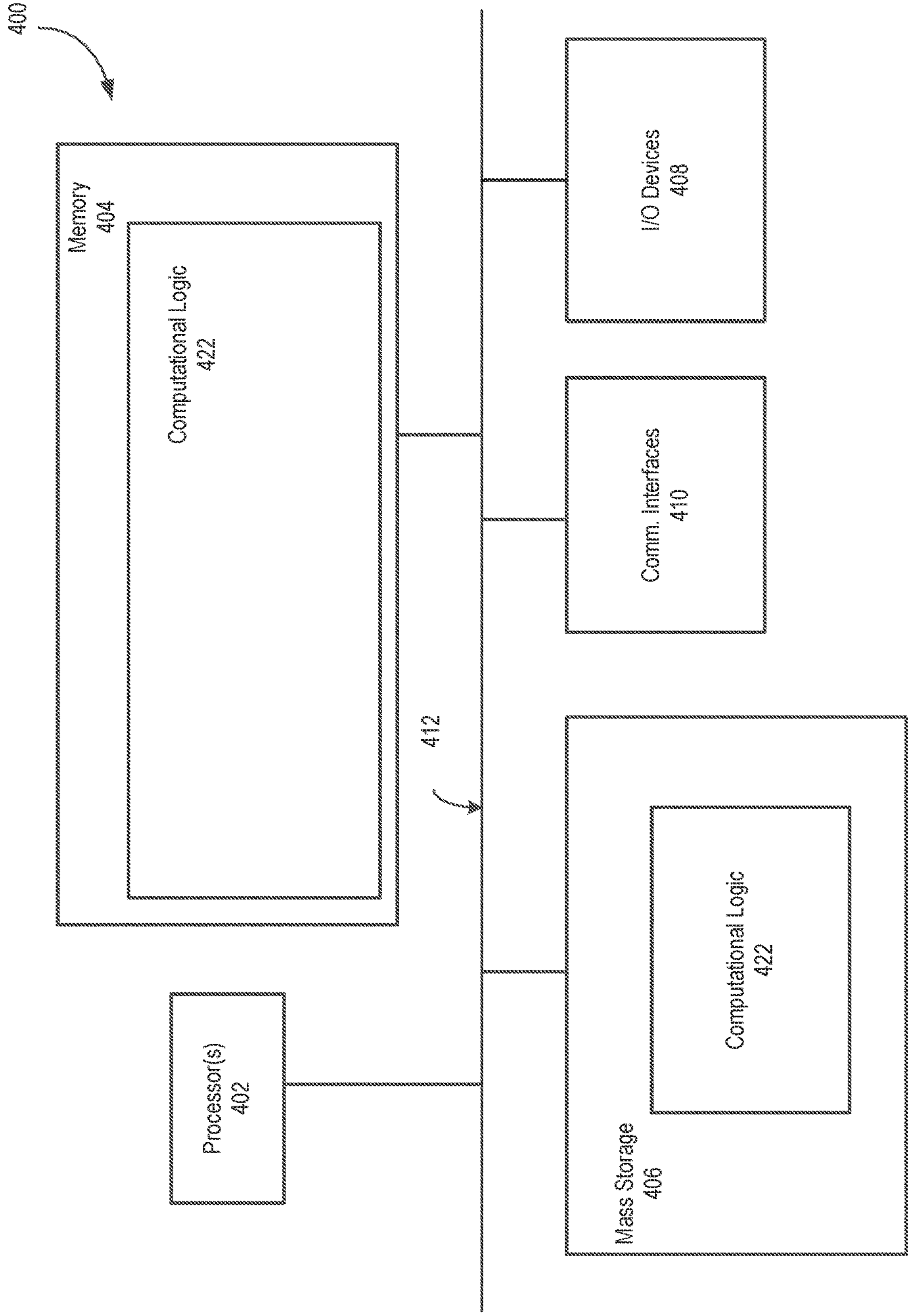
FIG. 4 illustrates an example computing system suitable for practicing various aspects of the disclosure, in accordance with various embodiments.

FIG. 4 illustrates an example computing device 400 suitable for use to practice aspects of the present disclosure, in accordance with various embodiments. For example, the example computing device 400 may be suitable to implement the functionalities described herein, or some other method, process, or technique described herein, in whole or in part.

As shown, computing device 400 may include one or more processors 402, each having one or more processor cores, and system memory 404. The processor 402 may include any type of unicore or multi-core processors. Each processor core may include a central processing unit (CPU), and one or more level of caches. The processor 402 may be implemented as an integrated circuit. The computing device 400 may include mass storage devices 406 (such as diskette, hard drive, volatile memory (e.g., dynamic random access memory (DRAM)), compact disc read only memory (CD-ROM), digital versatile disk (DVD) and so forth). In general, system memory 404 and/or mass storage devices 406 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 400 may further include input/output (I/O) devices 408 such as a display, keyboard, cursor control, remote control, gaming controller, image capture device, one or more three-dimensional cameras used to capture images, and so forth, and communication interfaces 410 (such as network interface cards, modems, infrared receivers, radio receivers (e.g., Bluetooth), and so forth). I/O devices 408 may be suitable for communicative connections with three-dimensional cameras or user devices. In some embodiments, I/O devices 408 when used as user devices may include a device necessary for implementing the functionalities of receiving an image captured by a camera.

The communication interfaces 410 may include communication chips (not shown) that may be configured to operate the device 400 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 410 may operate in accordance with other wireless protocols in other embodiments.

The above-described computing device 400 elements may be coupled to each other via system bus 412, which may represent one or more buses. In the case of multiple buses, they may be bridged by one or more bus bridges (not shown). Each of these elements may perform its conventional functions known in the art. In particular, system memory 404 and mass storage devices 406 may be employed to store a working copy and a permanent copy of the programming instructions implementing the operations and functionalities described herein, or some other method, process, or technique described herein, in whole or in part, generally shown as computational logic 422. Computational logic 422 may be implemented by assembler instructions supported by processor(s) 402 or high-level languages that may be compiled into such instructions.

In some embodiments, various of the optical mode convertors described herein (e.g., optical mode convertors 103/203/503, or some other optical mode convertor) may be used in the computing device 400. For example, in some embodiments the system bus (or some other bus) may include an optical bus with an optical mode convertor present. In another embodiment, one or more of the communications interfaces 410 and I/O devices 408 (or some other component) may be coupled with another component of the computing device 400 via an optical pathway that includes the optical mode convertor. In yet another example, a specific element (e.g., an element of computational logic 422 and/or a processor 402) may feature an optical pathway that includes the optical mode convertor. It will be understood that these examples are intended as non-limiting examples of such use cases, and other embodiments may include additional or alternative use cases as will be recognized by one of skill in the art.

Some non-limiting Examples of various embodiments are presented below.

Example 1 includes an apparatus (e.g., such as may be, may be in, or may be part of an optical mode convertor), the apparatus comprising: a buried oxide (BOX) layer; a silicon (Si) slab positioned on the BOX layer; and a Si waveguide positioned on the BOX layer; wherein the apparatus includes: an input stage with an input Si slab height, an input Si waveguide height, and an input height difference between the input Si slab height and the input Si waveguide height; an output stage with an output Si slab height that is different from the input Si slab height, an output Si waveguide height that is different from the input Si waveguide height, and an output height difference between the output Si slab height and the output Si waveguide height that is different from the input height difference; and a transition stage positioned between the input stage and the output stage, wherein the transition stage has a transition Si slab height, a transition Si waveguide height, and a transition height difference between the transition Si slab height and the transition Si waveguide height.

Example 2 includes the optical mode convertor of example 1, and/or some other example herein, wherein a first face of the Si waveguide is coupled with a face of the BOX layer, and wherein a second face of the Si waveguide that is opposite the first face is parallel to the face of the BOX layer at the input stage, the transition stage, and the output stage.

Example 3 includes the optical mode convertor of any of examples 1-2, and/or some other example herein, wherein the BOX layer has a height of approximately 1 micrometer (micron).

Example 4 includes the optical mode convertor of any of examples 1-3, and/or some other example herein, wherein the transition height difference is the same as the output height difference.

Example 5 includes the optical mode convertor of any of examples 1-4, and/or some other example herein, wherein the input Si waveguide height is the same as the transition Si waveguide height.

Example 6 includes the optical mode convertor of any of examples 1-4, and/or some other example herein, wherein the output Si waveguide height is the same as the transition Si waveguide height.

Example 7 includes the optical mode convertor of any of examples 1-6, and/or some other example herein, wherein the transition Si slab height is greater than the input Si slab height.

Example 8 includes the optical mode convertor of any of examples 1-6, and/or some other example herein, wherein the transition Si slab height is less than the input Si slab height.

Example 9 includes a method of manufacturing an optical mode convertor, wherein the method comprises: forming a buried oxide (BOX) layer; forming a silicon (Si) slab positioned on the BOX layer, wherein the Si slab has an input Si slab height at an input stage of the optical mode convertor, an output Si slab height at an output stage of the optical mode convertor, and a transition Si slab height at a transition stage of the optical mode convertor, wherein the transition stage is between the input stage and the output stage, and wherein the output Si slab height is different from the input Si slab height; and forming a Si waveguide positioned on the BOX layer, wherein the Si waveguide has an input Si waveguide height at the input stage, an output Si waveguide height at the output stage, and a transition Si waveguide height at the transition stage, wherein the input Si waveguide height is different from the output Si waveguide height.

Example 10 includes the method of example 9, and/or some other example herein, wherein a first face of the Si waveguide is coupled with a face of the BOX layer, and wherein a second face of the Si waveguide that is opposite the first face is parallel to the face of the BOX layer at the input stage, the transition stage, and the output stage.

Example 11 includes the method of any of examples 9-10, and/or some other example herein, wherein a difference between the transition Si slab height and the transition Si waveguide height is the same as a difference between the output Si slab height and the output Si waveguide height.

Example 12 includes the method of any of examples 9-11, and/or some other example herein, wherein the input Si waveguide height is the same as the transition Si waveguide height.

Example 13 includes the method of any of examples 9-12, and/or some other example herein, wherein the transition Si slab height is greater than the input Si slab height.

Example 14 includes the method of any of examples 9-12, and/or some other example herein, wherein the transition Si slab height is less than the input Si slab height.

Example 15 includes an electronic device comprising: an optical source configured to provide an optical signal with a first optical mode; and an optical convertor configured to transition the optical signal from the first optical mode to a second optical mode, wherein the optical convertor includes: a buried oxide (BOX) layer with a height of approximately 1 micrometer (micron); a silicon (Si) slab positioned on the BOX layer, wherein the Si slab has an input Si slab height at an input stage of the optical mode convertor, an output Si slab height at an output stage of the optical mode convertor, and a transition Si slab height at a transition stage of the optical mode convertor that is between the input stage and the output stage, wherein the output Si slab height is different from the input Si slab height; and a Si waveguide positioned on the BOX layer, wherein the Si waveguide has an input Si waveguide height at the input stage, an output Si waveguide height at the output stage, and a transition Si waveguide height at the transition stage, wherein the input Si waveguide height is different from the output Si waveguide height.

Example 16 includes the electronic device of example 15, and/or some other example herein, wherein a first face of the Si waveguide is coupled with a face of the BOX layer, and wherein a second face of the Si waveguide that is opposite the first face is parallel to the face of the BOX layer at the input stage, the transition stage, and the output stage.

Example 17 includes the electronic device of any of examples 15-16, and/or some other example herein, wherein a difference between the transition Si slab height and the transition Si waveguide height is the same as a difference between the output Si slab height and the output Si waveguide height.

Example 18 includes the electronic device of any of examples 15-17, and/or some other example herein, wherein the input Si waveguide height is the same as the transition Si waveguide height.

Example 19 includes the electronic device of any of examples 15-18, and/or some other example herein, wherein the transition Si slab height is greater than the input Si slab height.

Example 20 includes the electronic device of any of examples 15-19, and/or some other example herein, wherein the transition Si slab height is less than the input Si slab height.

Example 21 includes an apparatus comprising: an oxide layer with a thickness of approximately 1 micrometer (micron); a first portion that includes a first silicon (Si) element and a second Si element positioned on a face of the oxide layer, wherein the first Si element has a first height at the first portion and the second Si element has a second height at the first portion, and the second height is less than the first height; and a second portion that includes the first Si element with a third height and the second Si element with a fourth height that is less than the second height and the third height.

Example 22 includes the apparatus of example 21, and/or some other example herein, wherein a difference between the first height and the second height is different than a difference between the third height and the fourth height.

Example 23 includes the apparatus of any of examples 21-22, and/or some other example herein, further comprising a third portion that is between the first portion and the second portion in a direction parallel to the face of the oxide layer, wherein the third portion includes the first Si element with a fifth height and the second Si element with a sixth height; and (a) the fifth height is different than the first height or the third height, or (b) the sixth height is different than the second height or the fourth height.

Example 24 includes the apparatus of example 23, and/or some other example herein, wherein the sixth height is greater than the second height.

Example 25 includes the apparatus of example 23, and/or some other example herein, wherein the sixth height is less than the second height.

Example 26 includes the apparatus of example 23, and/or some other example herein, wherein the fifth height is the same as the first height.

In the preceding detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms “substantially,” “close,” “approximately,” “near,” and “about,” generally refer to being within +/−10% of a target value. Unless otherwise specified the use of the ordinal adjectives “first,” “second,” and “third,” etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases “A and/or B” and “A or B” mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Reference in the specification to "an embodiment," "one embodiment," "some embodiments," or "other embodiments" means that a particular feature, structure, or characteristic described in connection with the embodiments is included in at least some embodiments, but not necessarily all embodiments. Furthermore, the terms "comprising," "including," "having," and the like, as used with respect to embodiments of the present disclosure, are synonymous.

If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

The invention claimed is:

1. An apparatus comprising:

a buried oxide (BOX) layer;

a silicon (Si) slab positioned on the BOX layer; and a Si waveguide positioned on the BOX layer;

wherein the apparatus includes:

an input stage with an input Si slab height, an input Si waveguide height, and an input height difference between the input Si slab height and the input Si waveguide height;

an output stage with an output Si slab height that is different from the input Si slab height, an output Si waveguide height that is different from the input Si waveguide height, and an output height difference between the output Si slab height and the output Si waveguide height that is different from the input height difference; and a transition stage positioned between the input stage and the output stage, wherein the transition stage has a transition Si slab height, a transition Si waveguide height, and a transition height difference between the transition Si slab height and the transition Si waveguide height.

2. The apparatus of claim 1, wherein a first face of the Si waveguide is coupled with a face of the BOX layer, and wherein a second face of the Si waveguide that is opposite the first face is parallel to the face of the BOX layer at the input stage, the transition stage, and the output stage.

3. The apparatus of claim 1, wherein the BOX layer has a height of approximately 1 micrometer (micron).

4. The apparatus of claim 1, wherein the transition height difference is the same as the output height difference.

5. The apparatus of claim 1, wherein the input Si waveguide height is the same as the transition Si waveguide height.

6. The apparatus of claim 1, wherein the output Si waveguide height is the same as the transition Si waveguide height.

7. The apparatus of claim 1, wherein the transition Si slab height is greater than the input Si slab height.

8. The apparatus of claim 1, wherein the transition Si slab height is less than the input Si slab height.

9. A method of manufacturing an optical mode convertor, wherein the method comprises:

forming a buried oxide (BOX) layer;

forming a silicon (Si) slab positioned on the BOX layer, wherein the Si slab has an input Si slab height at an input stage of the optical mode convertor, an output Si slab height at an output stage of the optical mode convertor, and a transition Si slab height at a transition stage of the optical mode convertor, wherein the transition stage is between the input stage and the output stage, and wherein the output Si slab height is different from the input Si slab height; and forming a Si waveguide positioned on the BOX layer, wherein the Si waveguide has an input Si waveguide height at the input stage, an output Si waveguide height at the output stage, and a transition Si waveguide height at the transition stage, wherein the input Si waveguide height is different from the output Si waveguide height.

10. The method of claim 9, wherein a first face of the Si waveguide is coupled with a face of the BOX layer, and wherein a second face of the Si waveguide that is opposite the first face is parallel to the face of the BOX layer at the input stage, the transition stage, and the output stage.

11. The method of claim 9, wherein a difference between the transition Si slab height and the transition Si waveguide height is the same as a difference between the output Si slab height and the output Si waveguide height.

12. The method of claim 9, wherein the input Si waveguide height is the same as the transition Si waveguide height.

13. The method of claim 9, wherein the transition Si slab height is greater than the input Si slab height.

14. The method of claim 9, wherein the transition Si slab height is less than the input Si slab height.

* * * * *